United States Patent
Pawelec et al.

(10) Patent No.: US 10,717,544 B2
(45) Date of Patent: Jul. 21, 2020

(54) RELEASE MECHANISM (71) Applicant: Hamilton Sundstrand Corporation, Charlotte, NC (US)

(72) Inventors: Izabela Pawelec, Wieluń (PL); Krzysztof Kulakowski, Oława (PL); Tomasz Olszak, Zgorzelec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 412 days.

(21) Appl. No.: 15/680,366

(22) Filed: Aug. 18, 2017

(65) Prior Publication Data
US 2018/0050814 A1 Feb. 22, 2018

(30) Foreign Application Priority Data
Aug. 19, 2016 (EP) .................................... 16461553

(51) Int. Cl.
*B64D 41/00* (2006.01)
*F03D 9/32* (2016.01)

(52) U.S. Cl.
CPC ............ *B64D 41/007* (2013.01); *F03D 9/32* (2016.05); *B64D 2041/002* (2013.01); *F05B 2220/31* (2013.01)

(58) Field of Classification Search
CPC ............ Y10T 292/1021; Y10T 292/49; Y10T 292/216; B30B 1/10; B30B 1/006; B64D 41/007
See application file for complete search history.

(56) References Cited

U.S. PATENT DOCUMENTS

| | | | | |
|---|---|---|---|---|
| 2,284,003 A | * | 5/1942 | Luppert | A47B 1/04 108/81 |
| 2,684,510 A | * | 7/1954 | Muller | B22D 17/32 164/343 |
| 2,885,893 A | * | 5/1959 | Lane | G21C 7/12 74/2 |
| 3,654,811 A | * | 4/1972 | Peterson | B64C 1/28 74/101 |
| 3,982,466 A | * | 9/1976 | Baker | B64D 7/08 89/1.58 |

(Continued)

FOREIGN PATENT DOCUMENTS

| CN | 104564926 A | 4/2015 |
|---|---|---|
| CN | 204327201 U | 5/2015 |

OTHER PUBLICATIONS

Extended European Search Report for International Application No. 16461553.6 dated Feb. 17, 2017, 5 pages.

*Primary Examiner* — Richard R. Green
*Assistant Examiner* — Michael B. Kreiner
(74) *Attorney, Agent, or Firm* — Cantor Colburn LLP (57) ABSTRACT

A toggle release mechanism comprises a base element and a toggle element rotatably mounted at a first end to the base element about a first axis for rotation between a first, locking position and a second, release position. The mechanism further comprises a link element mounted at a first end to a second end of the toggle element about a second axis parallel to the first axis. The first end of the toggle element comprises a first stop and the base element comprises a second stop opposed to the first stop. The first stop and the second stop are in contact when the toggle element is in its locked position, preventing rotational movement of the toggle element in one rotational direction.

12 Claims, 6 Drawing Sheets

(56) References Cited

U.S. PATENT DOCUMENTS

| | | | | |
|---|---|---|---|---|
| 4,094,208 A * | 6/1978 | Tsutsumi | B29C 45/681 |
| | | | 403/319 |
| 4,201,097 A * | 5/1980 | Passoni | B21B 25/02 |
| | | | 72/209 |
| 4,376,744 A * | 3/1983 | DeSantis | B30B 11/04 |
| | | | 264/106 |
| 4,462,266 A * | 7/1984 | Andreasen | B65D 90/64 |
| | | | 74/520 |
| 4,463,661 A * | 8/1984 | Tootle | F02K 1/76 |
| | | | 92/17 |
| 4,559,839 A * | 12/1985 | Legille | C21B 7/20 |
| | | | 74/88 |
| 4,749,064 A * | 6/1988 | Jinno | A61G 5/1018 |
| | | | 188/2 F |
| 4,800,767 A * | 1/1989 | Abrahamson | G05G 7/04 |
| | | | 74/106 |
| 4,833,972 A * | 5/1989 | Bohusch | A61G 13/10 |
| | | | 5/600 |
| 9,193,472 B2 * | 11/2015 | Sasscer | B64D 41/007 |
| 9,365,295 B2 * | 6/2016 | Sasscer | B64D 41/007 |
| 9,511,875 B2 * | 12/2016 | Sasscer | B64D 41/007 |
| 2011/0229309 A1 * | 9/2011 | Russ | B64D 41/007 |
| | | | 415/126 |
| 2013/0078026 A1 * | 3/2013 | Sasscer | B64D 41/007 |
| | | | 403/81 |
| 2013/0327207 A1 | 12/2013 | Sasscer et al. |
| 2013/0327885 A1 | 12/2013 | Sasscer |
| 2013/0330121 A1 | 12/2013 | Sasscer et al. |
| 2016/0046383 A1 * | 2/2016 | Bannon | F15B 15/14 |
| | | | 92/15 |
| 2016/0347017 A1 * | 12/2016 | Riemer | B30B 15/0029 |
| 2018/0117654 A1 * | 5/2018 | Hubbes | B30B 1/16 |
| 2018/0201389 A1 * | 7/2018 | Bobak | B64D 41/007 |
| 2019/0092489 A1 * | 3/2019 | Kielczykowski | B64D 41/00 |

* cited by examiner

RELEASE MECHANISM

FOREIGN PRIORITY

This application claims priority to European Patent Application No. 16461553.6 filed Aug. 19, 2016, the entire contents of which is incorporated herein by reference.

TECHNICAL FIELD

The present disclosure relates to release mechanisms, in particular but not exclusively, to release mechanisms for Ram Air Turbines (RATs).

BACKGROUND

Ram Air Turbines (RATs) are used in aircraft to provide electric and/or hydraulic power to components of the aircraft, for example in the event of failure of other electrical or hydraulic power generating equipment on board the aircraft. In normal operation of the aircraft, the RAT is housed within the aircraft, but when needed it is extended into the airflow around the aircraft such that it may turn and generate electrical and/or hydraulic power. The RAT is typically pivoted into position by means of an actuator, for example a hydraulic actuator. The actuator typically includes a piston which extends to deploy the RAT. The actuator has a locking mechanism which prevents inadvertent movement of the piston and thus inadvertent deployment of the RAT. The locking mechanism typically comprises a spring loaded locking piston which must be moved in an axial direction to release the actuator. Such a mechanism is disclosed for example in US 2013/0327207 A1.

A release mechanism is provided to permit this movement. Typically, the release mechanism comprises a toggle type linkage, one end of which is coupled to one end of the locking piston and the other end of which is axially fixed and rotatably coupled to a support. A linear solenoid moves the linkage between a locked and an unlocked position. In moving between the two positions, the linkage must go "over centre" and initially displace the lock piston against the force of the locking piston spring. The toggle mechanism may comprise multiple components which must be assembled with tight tolerances, thereby complicating assembly.

SUMMARY

There is disclosed herein a toggle release mechanism comprising a base element and a toggle element rotatably mounted at a first end to the base element about a first axis for rotation between a first, locking position and a second, release position. A link element is mounted at a first end to a second end of the toggle element about a second axis parallel to the first axis. The first end of the toggle element comprises a first stop and the base element comprises a second stop opposed to the first stop. The first stop and the second stop are in contact when the toggle element is in its locked position, preventing rotational movement of the toggle element in one rotational direction.

The first stop may be formed as a stop surface.

The second stop may also or alternatively be formed as a stop surface.

The first stop may be arranged to one side of the first axis, and the first end of the toggle element on the other side of the first axis may be angled away from the base element.

In embodiments, the first end of the toggle element on the other side of said first axis may be curved.

The toggle release mechanism may further comprise an actuating element mounted to the toggle element for rotating the toggle element around said first axis.

The actuating element may be a rod coupled to an actuator.

The first end of the toggle element may be formed with a clevis, a clevis pin being received in the clevis for forming the first axis.

The toggle release mechanism may further comprise a return spring for rotating the toggle element in a direction towards the locking position.

The return spring may be a torsion spring mounted around the clevis pin for engagement with the toggle element and the base element.

The base element may comprise a fastener for attachment to a support.

The toggle release mechanism may further comprise a coupling element mounted to a second end of the link element about a third axis parallel to the first and second axes.

The disclosure also extends to a ram air turbine actuation mechanism comprising a spring biased locking piston movable between a first position in which the ram air turbine is held in a retracted position and a second position which releases the ram air turbine, the ram air turbine actuation mechanism further comprising a toggle release mechanism as described above, the locking piston being coupled to the link element of the toggle release mechanism to apply a force thereto in a direction towards said base element of the toggle release mechanism.

The locking piston may abut the coupling element of the toggle release mechanism. In certain embodiments, the coupling element may be received within an open end of the locking piston.

BRIEF DESCRIPTION OF DRAWINGS

An embodiment of the disclosure will now be described by way of example only, with reference to the accompanying drawings in which.

DETAILED DESCRIPTION

Figure 1:
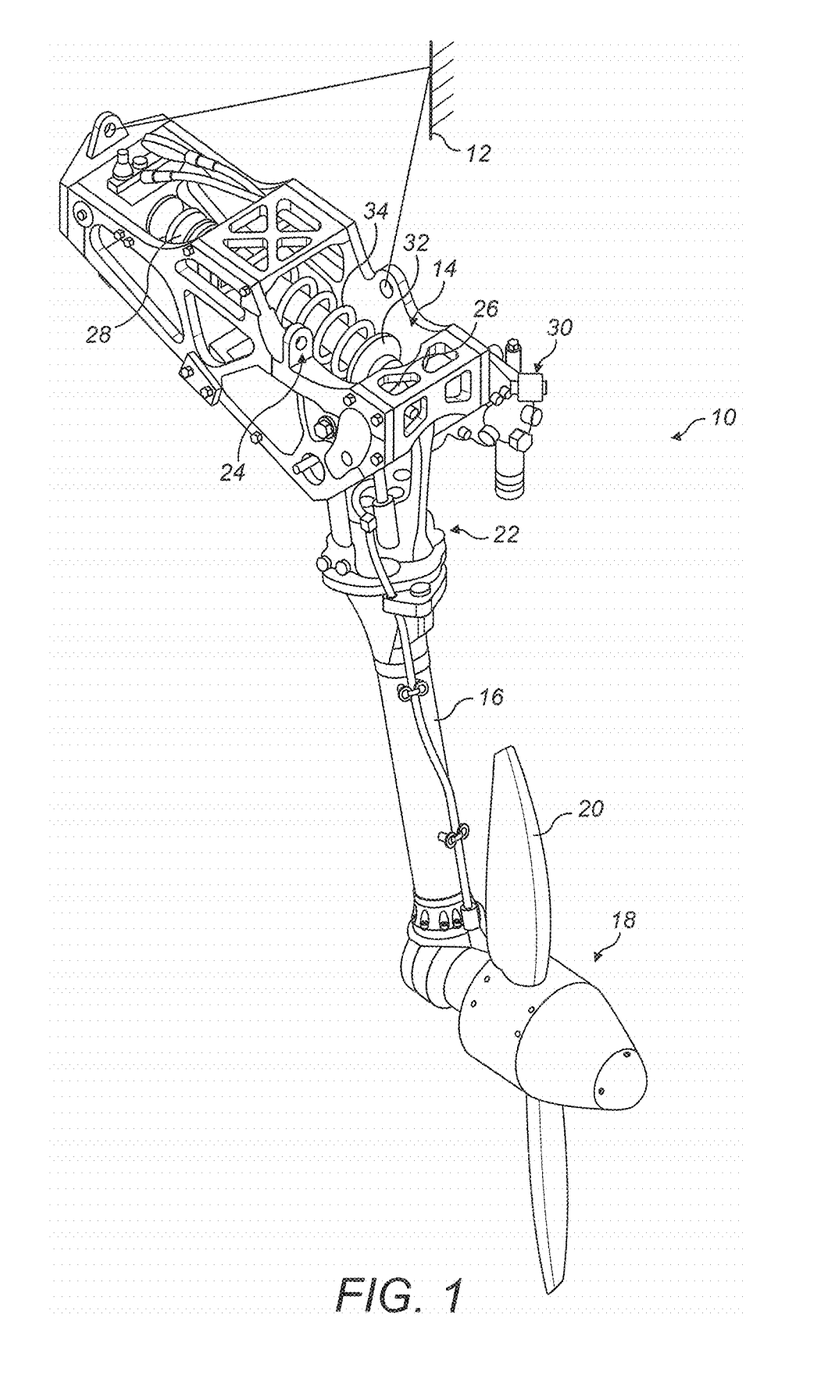
FIG. 1 shows a ram air turbine.

FIG. 1 illustrates an exemplary RAT system 10 which is secured to an aircraft structure 12 by a housing 14. The housing 14 pivotally supports a strut 16 having a turbine 18 at one end. The turbine 18 includes blades 20, which impart rotational drive to a generator 22 and hydraulic pump 30 for example. An actuator 24 is secured to the strut at a first end 26 and to the housing at a second end 28. The actuator 24 is illustrated in its deployed position.

The actuator 24 comprises a cylinder 32 which is biased by a spring 34 in order to deploy the strut 16. When the cylinder 32 is retracted, it is held in its retracted position by means of a locking mechanism 36, details of which will be described with reference to FIG. 2.

Figure 2:
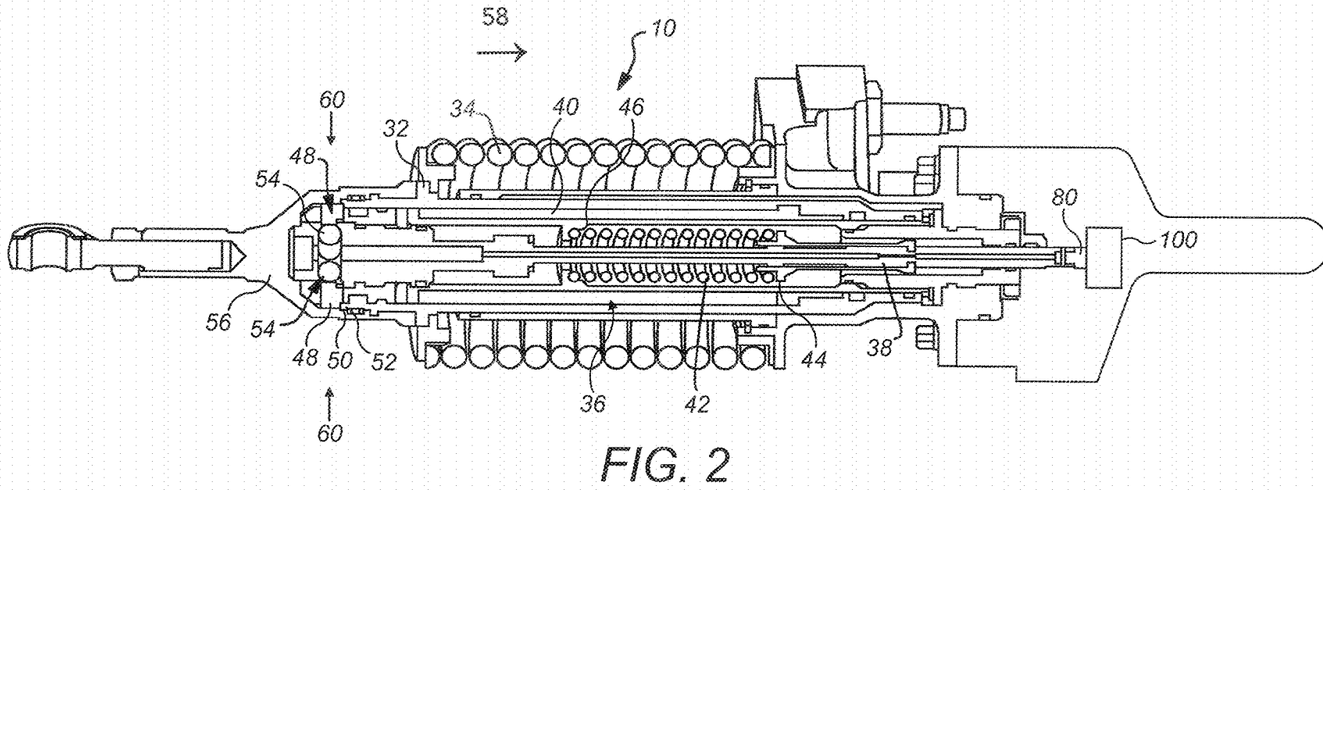
FIG. 2 shows, some detail of the ram air turbine of FIG. 1.

With reference to FIG. 2, the locking mechanism 36 comprises a locking piston or bolt 38 which is received slidably within a sleeve 40. The locking piston 38 is biased to the right in the sense of FIG. 2 by means of a biasing spring 42 which extends between a seat 44 provided on the locking piston 38 and a seat 46 provided on the sleeve 40.

The extensible cylinder 32 of the actuator is slidably mounted around the sleeve 40. Extension of the cylinder 32 is prevented by locking elements 48 mounted at the end of the sleeve. In the locking position, respective shoulders 50, 52 of the cylinder 32 and locking wedges 48 engage to prevent axial movement of the cylinder 32.

A number of rollers 54 are mounted in the distal end 56 of the locking piston 38. However, it will be noted that when the locking piston 38 is moved to the right in a direction of arrow 58 under the force of the biasing spring 42, the wedges 48 may displace in the direction of arrows 60 thereby disengaging the shoulders 50, 52 and allowing the cylinder 32 to extend to deploy the RAT. This general type of locking mechanism is known in the art and is discussed in some detail, for example in US 2013/0330121 A1 and US2013/0327885 A1.

To unlock the locking mechanism, the distal end 80 of the locking piston 38 is attached to a toggle release mechanism 100 illustrated only schematically in FIG. 2. In essence, as will be described further below, the release mechanism 100 is movable between a locking position in which it retains the locking piston 38 in the position shown in FIG. 2 and a release position in which it permits the locking piston 38 to move to the right under the force of the spring 42, move the rollers 54 of the locking piston 38 out of alignment with the locking surfaces of the locking wedges 48, thereby allowing deployment of the actuator cylinder 32.

A toggle release mechanism in accordance with an embodiment of the disclosure will now be described with reference to FIGS. 3 to 8.

Figure 3:
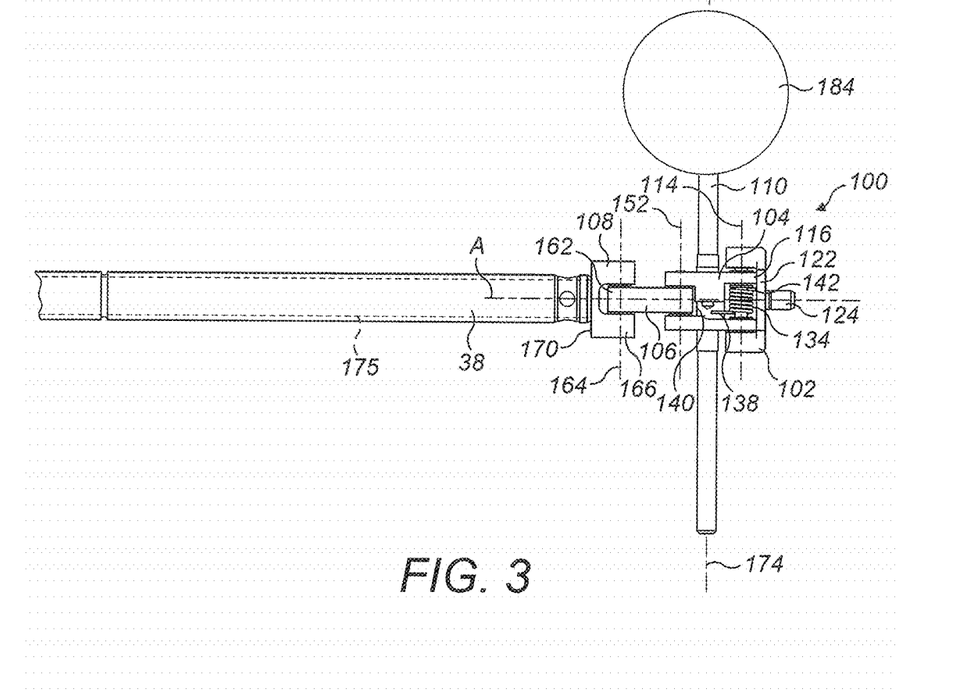
FIG. 3 shows, schematically, a plan view of a toggle release mechanism and locking piston of a ram air turbine locking mechanism.
Figure 3A:
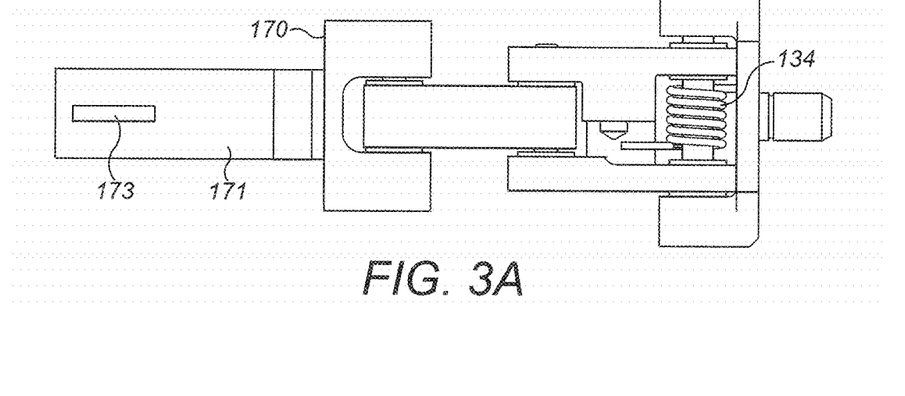
FIG. 3A shows a top view the toggle release mechanism of FIG. 3.
Figure 4:
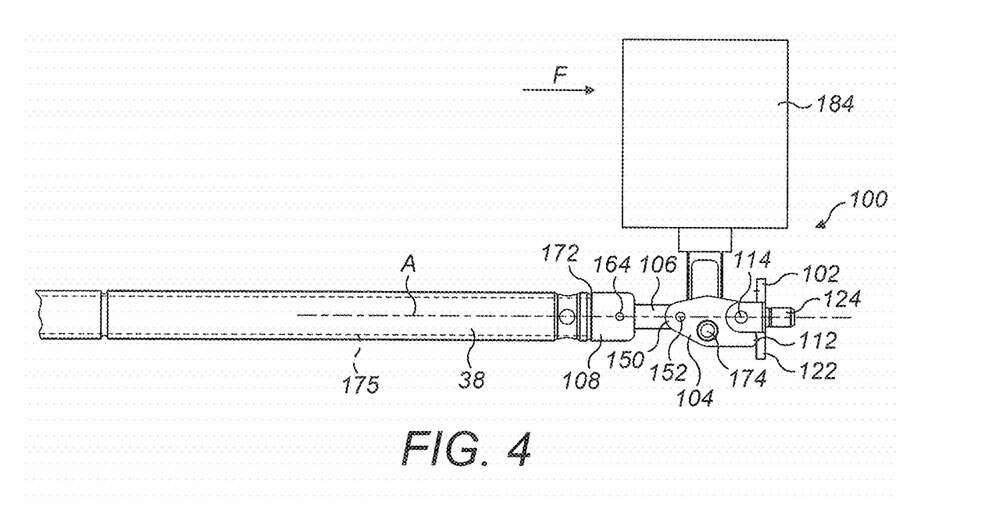
FIG. 4 shows a side view of the toggle release mechanism and locking piston of FIG. 3.
Figure 4A:
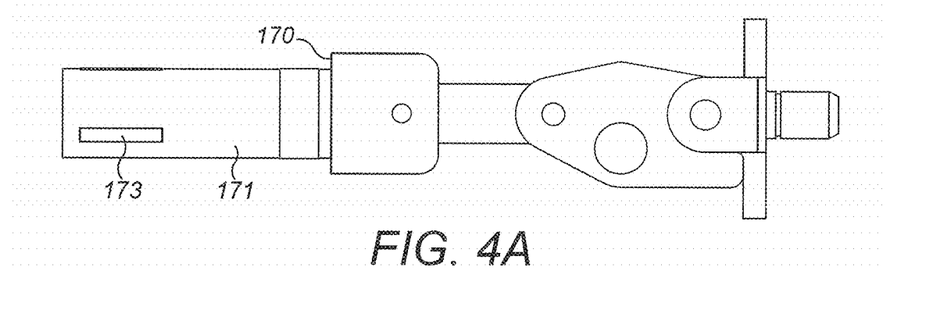
FIG. 4A shows a side view of the toggle release mechanism of FIG. 3.

As illustrated in FIGS. 3 and 4, the toggle release mechanism 100 may be coupled to the locking piston 38 of the ram air turbine discussed above. However, it will be appreciated that the toggle release mechanism 100 may be used in many other applications.

The toggle release mechanism 100 comprises a base element 102, a toggle element 104, a link element 106, a coupling element 108 and an actuating element 110.

The toggle element 104 is pivotally coupled at a first end 112 to the base element 102 about a first axis 114. The first end 112 of the toggle element 102 is formed with a clevis 116 which receives a clevis pin 118 about which the toggle element 104 pivots. The clevis pin 118 is retained in a clevis 120 formed on the base element 102 and projecting towards the toggle element 104 from a base portion 122.

A mounting element 124, projects from the base portion 122 in the direction away from the toggle element 104. The mounting element 124 is used to locate the toggle release mechanism 100, for example in a housing, for example in the RAT actuator housing as will be described further below.

In this embodiment, the mounting element 124 is generally co-planar with and perpendicular to the first axis 114. The mounting element 124 is in this embodiment formed as a pin with a cylindrical shape, allowing the mounting element 124 to be inserted in a complementary bore in the housing and rotated about the axis of the element to allow accurate alignment of the base element 102 in the housing. Advantageously, the mounting element 124 will be a tight fit with the bore to provide accurate positioning of the base element 102. The base element 102 may be fastened to the housing by fasteners (not shown) which may extend through mounting bores 125 provided in the base portion 122 of the base element 102. In this embodiment, two mounting bores 125 are provided arranged centrally of the base portion 122 so as to lie between the arms of the clevis 116 of the first end 112 of the toggle element 102. Of course other forms of mounting element may be provided and other mounting arrangements may be provided.

The base portion 122 of the base element 102 comprises a pair of stops in the form of stop surfaces 126 arranged below the first axis 114. In this embodiment, the stop surfaces 126 are part of a single surface of the base portion 122, although separate surfaces may be provided.

The end faces 128 of the toggle element clevis 116 are also formed with stops in the form of stop surfaces 130. The stop surfaces 130 are also arranged below the first axis 114 and opposite the base element stop surfaces 126. In other embodiments, however, the stops may not be formed as surfaces, but other formations, for example raised formations.

The end faces 128 of the toggle element 104 above the first axis 114 are formed as arcuate surfaces 132 for reasons to be explained further below. In other embodiments, the arcuate surfaces 132 may instead be formed as chamfered surfaces.

A return spring 134 is also provided between the base element 102 and the toggle element 104. In this embodiment, the return spring 134 is a torsion spring mounted around the clevis pin 118. The spring 134 has a first spring end 138 engaging a surface 140 at the base of the toggle clevis 112 and a second end 142 which is received in a bore 144 in the base element 102. Of course other forms of return spring may also be provided within the scope of the disclosure.

The link element 106 is pivotally connected to a second end 150 of the toggle element about a second pivot axis 152 which is parallel to the first axis 114. The second end 150 of the toggle element 104 is also formed with a clevis 156, receiving a clevis pin 158 which extends through a first end 160 of the link element 106 and forms the second pivot axis 152.

A second end 162 of the link element 106 is pivotally connected to the coupling element 108 about a third pivot axis 164 which is parallel to the first and second axes 114, 152. The coupling element 108 is formed with a clevis 166 which receives a clevis pin 168 which extends through the second end of the link element 106 and forms the third pivot axis 164.

The coupling element 108 is formed with an end surface 170 which abuts the end surface 172 of the locking piston 38. In this embodiment, the coupling element 108 further comprises a stem 171 which is received within a bore 175 formed in the adjacent end of the locking piston 38. Three or more fins 173 projecting from the stem 171 assist in locating the coupling element 108 within the bore 175. The fins 173 are typically equispaced around the circumference of the stem 171. The stem 171 may be easily removable from the bore 175. This may facilitate location of the coupling element 108. The coupling element 108 is constrained to move in an axial direction along axis A which passes through the first pivot axis 114 by virtue of its mounting to the locking piston 38, since the locking piston 38 is slidably mounted (by suitable means not shown) for movement along the axis A.

Figure 5:
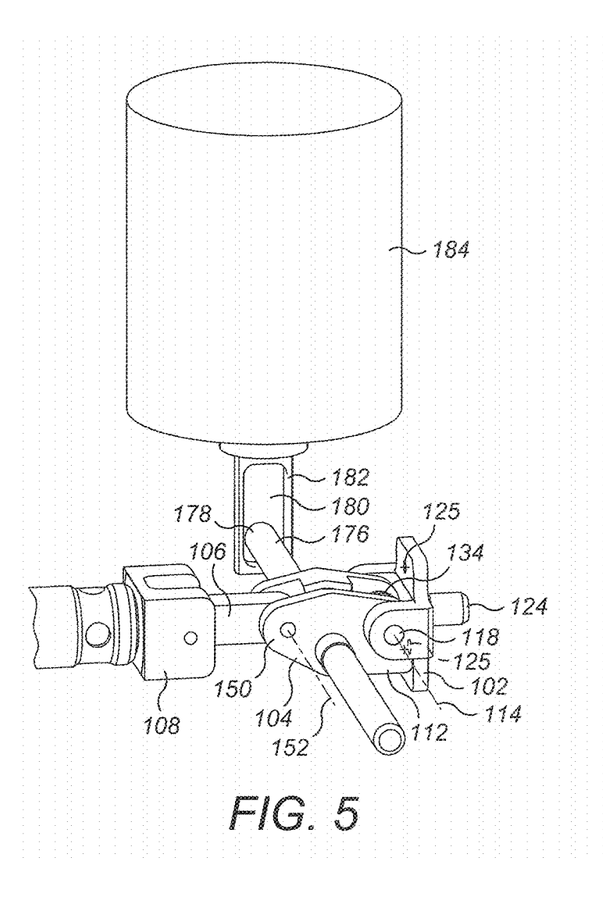
FIG. 5 shows a detail perspective view of the toggle release mechanism of FIG. 3 in a locked position.
Figure 6:
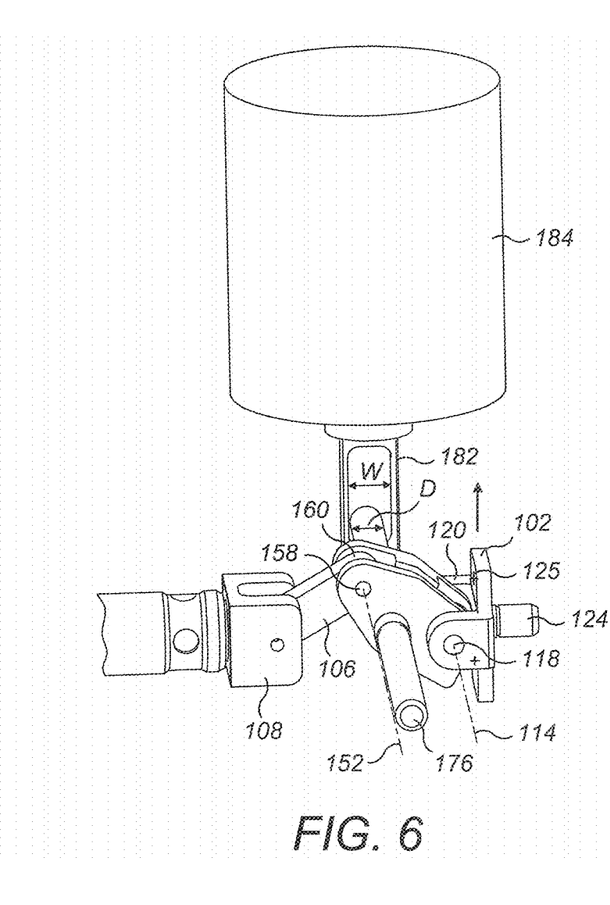
FIG. 6 shows a detail perspective view of the toggle release mechanism of FIG. 3 in a release position.
Figure 7:
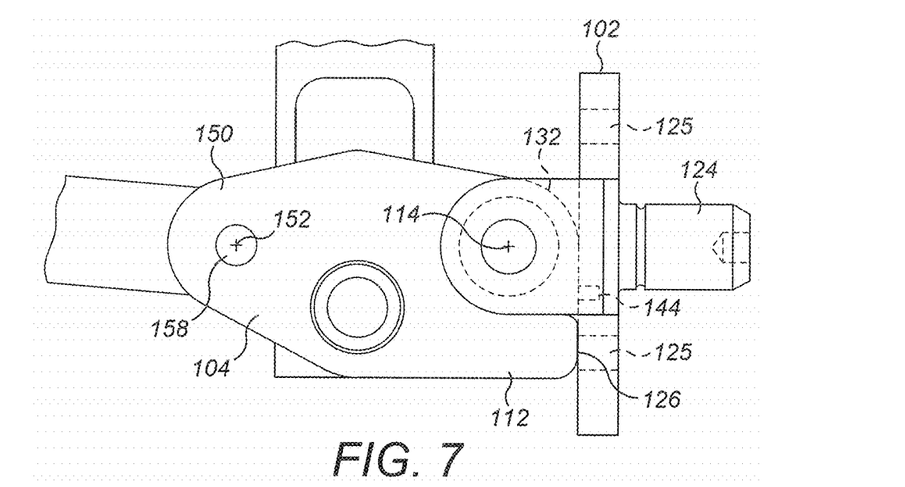
FIG. 7 shows a detail side view of the toggle release mechanism of FIG. 3 in the locked position.
Figure 8:
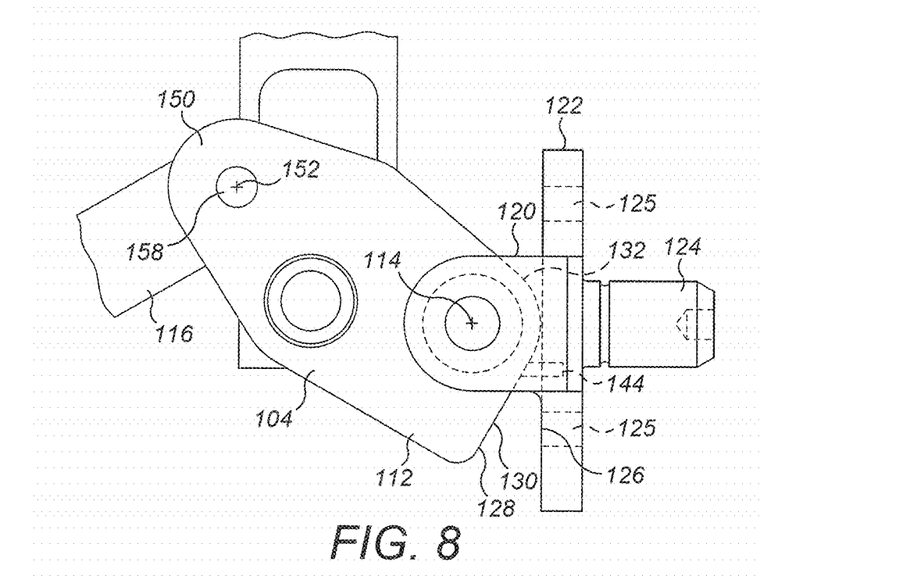
FIG. 8 shows a detailed side view of the toggle release mechanism of FIG. 3 in the release position.

The toggle element 104 also receives the actuating element 110. The actuating element is pivotally received about a fourth pivot axis 174 parallel to the first to third axes 114, 152, 164. In this embodiment, the actuating element 110 is a rod 176 which extends through the toggle element 104 and projects from both sides thereof. An end portion 178 of the rod 176 is received within a slot 180 of a plunger 182 of a linear solenoid actuator 184. Other linear actuators may be used within the scope of the disclosure. The slot 180 has a width W which is greater than the rod diameter D so as to allow some movement of the rod 176 in the axial direction. The solenoid actuator 184 produces an actuating movement transverse to the axis A as illustrated in FIG. 5 by arrow B. Only one solenoid actuator 184 is illustrated in the embodiment, but there will generally be two actuators 184 provided, one engaging each end 178 of the rod 176.

The installation and operation of the toggle release mechanism 100 will now be described.

The base element 102 is mounted to a support surface in the actuating mechanism or other mechanism to be released. As discussed above, this may be effected through the mounting element 124. In the context of the RAT actuator disclosed in FIGS. 1 and 2, the base element may be suitably mounted in a head region 200 of the actuator.

The coupling element 108 is then coupled to the locking element of the mechanism, be released. In the RAT embodiment of FIGS. 1 and 2, the coupling element 108 is coupled to the end of the locking piston 38 by virtue of the stem 171 of the coupling element 108 being received within the bore 175 of the locking piston, the opposed surfaces 170, 172 of the coupling element 108 and the locking piston 38 abutting.

The biasing spring 42 of the RAT locking mechanism exerts a force F in the axial direction A. The toggle release mechanism 100 will hold the locking piston 38 when it is in the locking position shown in FIGS. 4, 5 and 7. In this position, the second axis 152 lies below a line joining the first and third axes 114, 164. The force F therefore acts to rotate the toggle element 104 counter-clockwise (in the sense of the figures) to bring the stop surfaces 126, 130 into engagement. This engagement is dictated by the geometry and configuration of the toggle mechanism itself and not with reference to any external stop as was the case with certain prior art mechanisms.

When it is desired to unlock the RAT actuator, the solenoid actuator 184 is operated, pulling the actuating rod 176 upwardly in the sense of the Figures against the biasing force of the return spring 134. This will rotate the toggle element 104 clockwise about the first axis 114. When the second axis 152 moves above the line joining the first and third pivot axes 114, 164, the force of the spring 42 (which will be significantly greater than that of the return spring 134) will continue the clockwise rotation which, through the link element 106, will allow the coupling element 108 and the locking piston 38 to move to the right in the sense of the Figures. The width W of the slot 180 in the actuator plunger 182 will allow some axial movement of the actuating rod 176 caused by the rotation of the toggle element 104. Also, the curved surfaces 132 of the toggle clevis accommodate this movement, preventing interference between the toggle element 104 and the base element 102. The movement of the locking piston 38 will the rollers 54 of the locking piston 38 out of alignment with the locking surfaces of the locking wedges 48, thereby allowing deployment of the actuator cylinder 32.

The biasing force of the actuator biasing spring 42 will maintain the toggle element 104 in this position, and the solenoid actuator 184 may be de-energised. Typically, a spring provided within the solenoid actuator 184 may move the solenoid back it into its initial position.

When it is desired to stow the RAT once more, hydraulic pressure is applied to the actuator in order to move the locking piston 38 to the left. The toggle element 104 is then able to rotate clockwise about the first axis under the action of the return spring 134, which has been pre-loaded by the movement of the toggle element 104 to its release position. The actuating rod 176 is able to move freely in the slot 180, allowing the toggle element 104 to rotate back to the locking position. The hydraulic pressure on the actuator may then be removed so as to release the locking piston 38 which, by virtue of the biasing spring 42 will once more to act on the coupling element 108 which has by now returned to its original position.

Thus the toggle mechanism 100 described provides an internal blocking mechanism for setting a locked position, which is not dependent upon the engagement of an actuating element 110 provided externally of the toggle mechanism. This may simplify manufacture and assembly and reduce testing costs.

It will be understood that the terms "above" and "below" as used herein are relative terms and do not imply any particular orientation of the mechanism in use. In effect, they merely represent opposite sides of a longitudinal axis extending through the first axis 114.

It will also be understood that the above is a description of just one possible embodiment of the disclosure and that modifications may be made thereto without departing from the scope thereof.

The invention claimed is:

1. A ram air turbine actuation mechanism comprising a spring biased locking piston movable between a first position in which the ram air turbine is held in a retracted position and a second position which releases the ram air turbine, said ram air turbine actuation mechanism further comprising a toggle release mechanism that includes:
   a base element;
   a toggle element rotatably mounted at a first end to the base element about a first axis for rotation between a first, locking position and a second, release position;
   a link element mounted at a first end to a second end of the toggle element about a second axis parallel to the first axis;
   a coupling element mounted to a second end of the link element about a third axis parallel to the first and second axes;
   wherein the first end of the toggle element comprises a first stop and the base element comprises a second stop opposed to the first stop, the first stop and the second stop being in contact when the toggle element is in its locked position, preventing rotational movement of the toggle element in one rotational direction;
   wherein said locking piston is coupled to the link element of the toggle release mechanism to apply a force thereto in a direction towards said base element of the toggle release mechanism.

2. A ram air turbine actuation mechanism as claimed in claim 1, wherein said first stop is formed as a stop surface.

3. A ram air turbine actuation mechanism as claimed in claim 1, wherein said second stop is a surface.

4. A ram air turbine actuation mechanism as claimed in claim 1, wherein said first stop is arranged below said first axis, wherein the first end of the toggle element above the first axis is angled away from said base element.

5. A ram air turbine actuation mechanism as claimed in claim 4, wherein the first end of the toggle element above said the first axis is curved.

6. A ram air turbine actuation mechanism as claimed in claim 1, further comprising an actuating element mounted to the toggle element for rotating said toggle element around said first axis.

7. A ram air turbine actuation mechanism as claimed in claim 6, wherein said actuating element is a rod coupled to an actuator.

8. A ram air turbine actuation mechanism as claimed in claim 1, wherein the first end of the toggle element is formed with a clevis, a clevis pin being received in the clevis for forming the first axis.

9. A ram air turbine actuation mechanism as claimed in claim 8, further comprising a return spring for rotating the toggle element in a direction towards the locking position.

10. A ram air turbine actuation mechanism as claimed in claim 9, wherein the return spring is a torsion spring mounted around the clevis pin for engagement with the toggle element and the base element.

11. A ram air turbine actuation mechanism as claimed in claim 1, wherein the base element comprises a fastener for attachment to a support.

12. A ram air turbine actuation mechanism as claimed in claim 1, wherein the locking piston abuts the coupling element, the coupling element optionally comprising a stem received within a bore of the locking piston.

\* \* \* \* \*